Aug. 13, 1929.　　　A. CROSSMAN　　　1,724,750
MIXER
Filed Aug. 21, 1924
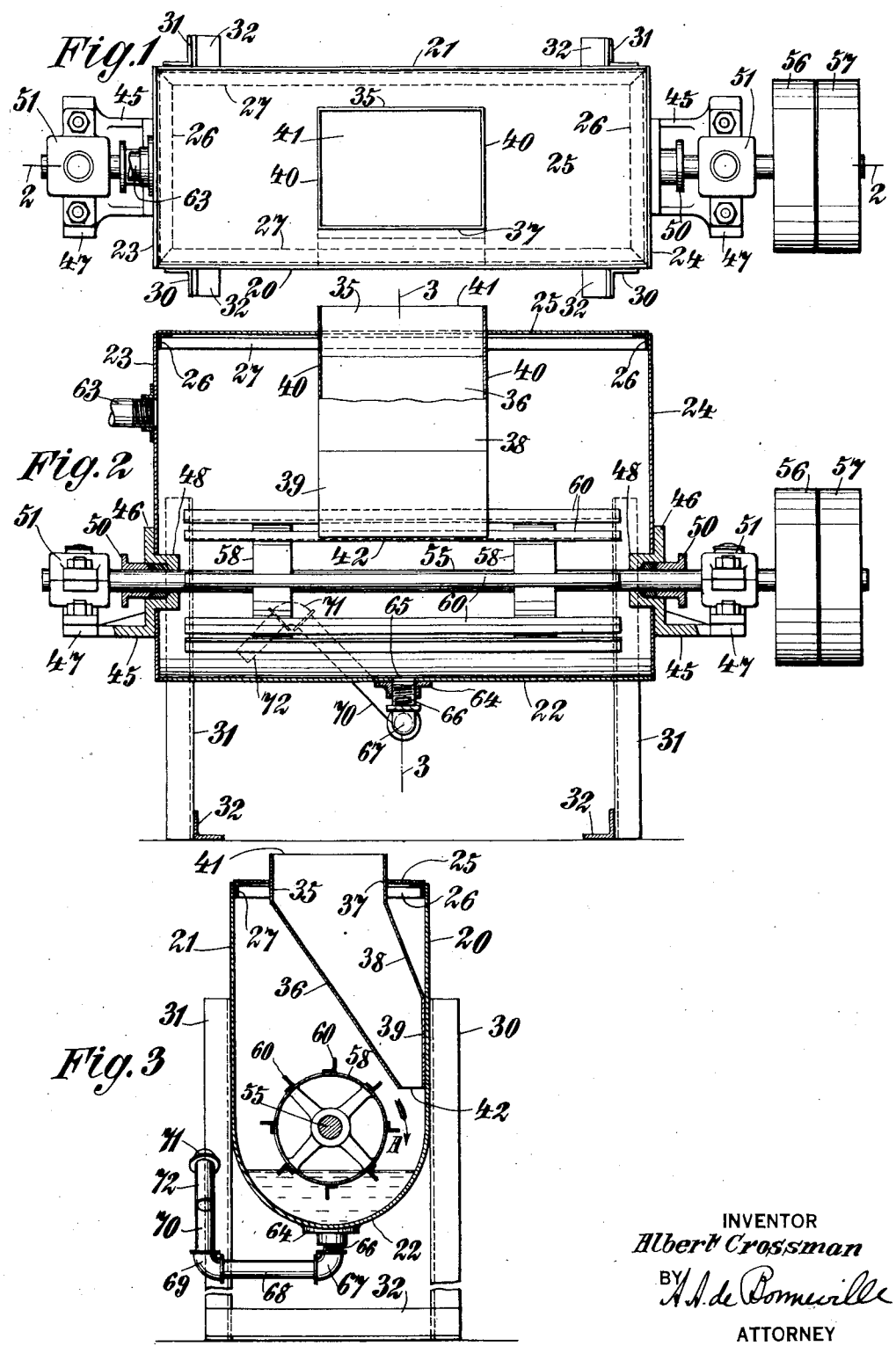
INVENTOR
Albert Crossman
BY
A. A. de Bonneville
ATTORNEY Patented Aug. 13, 1929.

1,724,750

UNITED STATES PATENT OFFICE.

ALBERT CROSSMAN, OF BROOKLYN, NEW YORK.

MIXER.

Application filed August 21, 1924. Serial No. 733,297.

This invention relates to an improved mixer. The object of the invention is the production of means, whereby solid ingredients are quickly mixed with fluids. A second object is the production of a mixer, which produces preferably a thin fluid, by beating a mixture of solid ingredients with a fluid. Other objects will be apparent from the following specification.

In the accompanying drawings Fig. 1 represents a top plan view of an exemplification of the improved mixer; Fig. 2 shows a partial section of Fig. 1 on the line 2, 2 and Fig. 3 indicates a partial section of Fig. 2 on the line 3, 3.

The mixer in this instance comprises the casing with the front wall 20, the rear wall 21, the round bottom wall 22, the side walls 23, 24, and the top wall 25. Angle irons 26 extend from the side walls 23 and 24, and angle irons 27 extend from the front and rear walls 20 and 21, to support the top wall 25. Legs 30 and 31 extend respectively from the said front and rear walls. Each pair of legs 30 and 31 are connected at their lower ends by the angle iron 32. A tapered inclined chute for solid ingredients extends into the casing and comprises the vertical wall 35, which joins with the lower inclined wall 36, the vertical wall 37, the intermediate inclined wall 38, and the vertical wall 39. The walls 35, 36, 37, 38 and 39 are located lengthwise of the mixer and their effective length are equal to the length of the inlet opening of the chute. Side walls for the chute are indicated at 40, which are spaced from each other to an extent equal to the width of the inlet opening of the chute. The upper large inlet opening of the chute is shown at 41 and its small bottom outlet opening is indicated at 42. The outlet opening 42 is horizontally spaced from the inlet opening 41 to maintain any splashings in the casing within the same. The wall 39 of the chute is fastened to the front wall 20 of the casing and the vertical walls 35 and 37 thereof extend up through the top wall 25 and are fastened thereto.

It will be noted that the width of the walls 35, 36, 37, 38 and 39 being the full width of the inlet opening 41, practically secures a closure for said opening. The outlet opening 42 is quite distant from the opening 41 and much smaller in area. By means of the novel construction of the chute the solid ingredients can be introduced and drop in the fluids in the mixer without splashing.

It will be noted that the wall 39 is an end wall and extends vertically from the inclined wall 38 and is at right angles to the walls 40, and that the outlet opening 42 is at right angles to said end of wall 39.

To the side walls 23 and 24 are fastened similar brackets and stuffing boxes, each of which is designated in its entirety by the numeral 45. Each bracket and stuffing box comprises the vertical wall 46, from which extends at right angles thereto the horizontal wall 47. The wall 46 has extending therefrom the barrel 48 of the stuffing box. The gland for the stuffing box is shown at 50. Each of the walls 47 has supported thereon and bolted thereto a journal box 51.

An operating shaft 55 extends through the casing, its stuffing boxes and its opposite ends are journaled in the journal boxes 51. One end of the shaft 55 supports the tight pulley 56 and the loose pulley 57. A pair of pulleys 58 in the casing are fastened to the shaft 55, and to the periphery of said pulleys 58 are fastened the angle irons 60 spaced from each other and parallel to the longitudinal axis of the said shaft 55. The pulleys 58 with their angle irons 60 constitute a beater, and said beater is located below the chute and practically covered thereby.

An inlet pipe 63 for fluids is connected to the side wall 23. To the bottom wall 22 is fastened the pipe flange 64 over an opening 65 therein. A nipple 66 with the elbow 67 extends from the flange 64. A pipe 68 with the elbow 69 extends from the elbow 67 and a pipe 70 with the elbow 71 and outlet nozzle 72 extends from the elbow 69. The pipe 70 with the elbow 69 can be swung to different inclinations and constitute a swinging joint, to vary the level of the outlet end of the outlet nozzle 72, and thereby vary the height, depth or quantity of the mixture in the casing.

To use the mixer solid ingredients are introduced into the casing thereof through the large inlet opening 41 of the chute in the casing. Fluids for the mixture are introduced into the casing through the inlet pipe 63. The shaft 55 is then turned, by means of a belt not shown extending from the tight pulley 56. By this means the angle irons 60 are revolved in the direction of the arrow A, Fig. 3, and as they move through the mixture they beat it and produce a fluid of the consistency required. The angle irons 60 of the beater revolve in the direction of the arrow A, force down the ingredients discharged from the chute and prevent the splashing of said ingredients up through said chute and force them to remain in the casing until discharged.

The mixer is specially adapted to produce thin fluids, and the shaft 55 is turned at a speed to produce the required consistency and complete mixture of the ingredients in a short interval of time. The mixture produced is discharged from the outlet nozzle 72, and its depth or level in the casing is varied by the position to which the outlet end of the outlet nozzle 72 is adjusted.

Having described my invention what I desire to secure by Letters Patent and claim is:

In a mixer for solid ingredients and fluids the combination of a casing, an inclined chute for the introduction of solid ingredients extending into the casing, said chute comprising side walls and a pair of inclined walls inclining toward each other at their lower ends, a vertical end wall extending from one of said inclined walls, said other inclined wall having an outlet opening formed therein, an inlet pipe connected to the casing for the introduction of fluids, a beater journaled in the casing below and covered by said chute, means to revolve the beater to pull down and mix the ingredients in the casing and an outlet nozzle for the casing.

Signed at the borough of Brooklyn, city of New York in the county of Kings and State of New York this second day of August A. D. 1924.

ALBERT CROSSMAN.